United States Patent
Someya et al.

(10) Patent No.: US 7,184,706 B2
(45) Date of Patent: Feb. 27, 2007

(54) MOBILE TERMINAL APPARATUS USING A COMMUNICATION PROTOCOL CAPABLE OF FLEXIBLE COMMUNICATION BETWEEN NON-CONTACT COMMUNICATION MEANS AND INTERNAL CONTROL MEANS

(75) Inventors: Takahisa Someya, Kanagawa (JP); Atsushi Imai, Tokyo (JP); Hideaki Imai, Kanagawa (JP); Hidehiko Takahashi, Kanagawa (JP)

(73) Assignees: Sony Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 175 days.

(21) Appl. No.: 10/948,148

(22) Filed: Sep. 24, 2004

(65) Prior Publication Data

US 2005/0108317 A1    May 19, 2005

(30) Foreign Application Priority Data

Sep. 30, 2003    (JP) .............................. 2003-342582

(51) Int. Cl.
*H04B 1/38* (2006.01)
*H04B 1/00* (2006.01)
*H04M 1/00* (2006.01)

(52) U.S. Cl. ................... 455/41.2; 455/558; 455/550.1
(58) Field of Classification Search ............... 455/558, 455/552.1, 41.2–41.3, 550.1; 235/514
See application file for complete search history.

(56) References Cited

U.S. PATENT DOCUMENTS

| | | | |
|---|---|---|---|
| 5,465,401 A | 11/1995 | Thompson | |
| 5,721,535 A * | 2/1998 | Ikefuji | ....................... 340/10.4 |
| 6,615,057 B1 | 9/2003 | Pettersson | |
| 2002/0107054 A1* | 8/2002 | Fujisawa et al. | ............. 455/573 |
| 2002/0177407 A1* | 11/2002 | Mitsumoto | ................... 455/41 |
| 2003/0189096 A1* | 10/2003 | Markkanen et al. | ........ 235/451 |
| 2004/0072592 A1* | 4/2004 | Hasegawa | .................. 455/558 |

FOREIGN PATENT DOCUMENTS

| | | |
|---|---|---|
| EP | 1 098 271 A1 | 5/2001 |
| JP | 2000259790 A * | 9/2000 |
| WO | WO 99/22538 | 5/1999 |
| WO | WO 01/99066 A1 | 12/2001 |

OTHER PUBLICATIONS

Electronic translation for Japanese Document: JP2000-259790.*

* cited by examiner

*Primary Examiner*—Lester G. Kincaid
*Assistant Examiner*—Marisol Figueroa
(74) *Attorney, Agent, or Firm*—Oblon, Spivak, McClelland, Maier & Neustadt, P.C.

(57) ABSTRACT

At a mobile terminal apparatus provided with a non-contact IC, flexible communication is carried out between the external reader/writer , non-contact IC and the internal application manager controller, and a program designated in the form of a push from the external reader/writer is activated and executed in a smooth manner at the mobile terminal apparatus. Normally, the non-contact IC cannot communicate with the application manager controller during communication with the external reader/writer, and cannot communicate with the external reader/writer during communication with the application manager controller. A specific command is transmitted from the external reader/writer together with information specifying a prescribed application during communication between the external reader/writer and the non-contact IC. When the specific command is received, the non-contact IC shifts to a communication state enabling communication with the application manager controller. The application manager controller captures and executes information specifying the application at the timing of the transition.

8 Claims, 6 Drawing Sheets

MOBILE TERMINAL APPARATUS USING A COMMUNICATION PROTOCOL CAPABLE OF FLEXIBLE COMMUNICATION BETWEEN NON-CONTACT COMMUNICATION MEANS AND INTERNAL CONTROL MEANS

CROSS REFERENCE TO RELATED APPLICATION

This application claims priority from Japanese Priority Application No. 2003-342582, filed on Sep. 30, 2003 with the Japanese Patent Office, the entire content of which is hereby incorporated by reference.

BACKGROUND OF THE INVENTION

1. Field of the Invention

The present invention relates to mobile terminal apparatuses suited to utilization as mobile telephones provided with non-contact ICs (IC: Integrated Circuit), PHS telephones (Personal Handyphone System), or PDA apparatuses (Personal Digital Assistant) etc.

2. Description of Related Art

An electronic ticketing system using mobile terminals is disclosed in Japanese Patent Application Publication No. 2001-266178 (patent document 1).

In this electronic ticketing system, a user operates a mobile terminal so as to communicate with an advance ticket sales host computer so as to purchase desired tickets such as express tickets, tickets for a reserved seat, and periodic commuter tickets in advance. The advance ticket sales host computer then connects to a host computer of a bank or credit company specified by the user. Settlement processing is then carried out through communication with the host computer of the bank or credit company specified by the user while the advance ticket purchase is taking place.

Further, after the settlement processing, the advance ticket sales host computer sends purchasing information indicating the ticket purchased by the user to the mobile terminal of the user. The mobile terminal of the user then stores this purchasing information in an IC module provided at the mobile terminal. When the user then holds up the mobile terminal when passing through an automatic ticketing machine, automatic ticketing is carried out through communication with the automatic ticketing machine based on the purchasing information stored in the IC module.

In Japanese Patent Application Publication No. 2002-197419 (patent document 2), there is disclosed an information processing apparatus and data communication method for notifying users of content of each process by providing light-emitting diodes on the four corners of a non-contact IC card and controlling generation of light by the light-emitting diodes according to the content of communication with the reader/writer.

Further, a route guidance system for finding routes using a non-contact IC card provided in a mobile information terminal is disclosed in Japanese Patent Application Publication No. 2002-298169 (Patent Document 3).

In this route guidance system, communication is carried out between a non-contact IC card provided in a mobile information terminal and an automatic ticketing machine while a user passes through the automatic ticketing machine and information regarding stations entered is sent from the automatic ticketing machine to the mobile information terminal.

In the event that information for the station entered is received, the mobile information terminal invites input of the destination etc. of the user. In the event that the input takes place, destination information, entered station information, and information for the time of entering etc. is sent to a route retrieval server via a base station. The route retrieval server then retrieves routes for the user based on this information and sends route retrieval results to the mobile information terminal of the user via the base station. As a result, it is possible for the user to automatically obtain route information to their own destination simply by passing through an automatic ticketing machine.

[Patent document 1] Japanese Patent Application Publication No. 2001-266178 (page 3 to page 5: FIG. 1)

[Patent document 2] Japanese Patent Application Publication No. 2002-197419 (page 5: FIG. 1)

[Patent document 3] Japanese Patent Application Publication No. 2002-298169 (page 4: FIG. 4)

However, in order to implement the systems etc. disclosed in each of the patent documents 1 to 3 etc. described above, for example, it is necessary to maintain a specific communication protocol for communication between the reader/writer provided at the automatic ticketing machine etc. and the non-contact IC card provided on the mobile terminal apparatus side, and it is necessary for applications designated by the reader/writer through communication with the reader/writer to be activated and executed at the mobile terminal apparatus in a smooth manner.

However, with the present protocol for communicating with non-contact IC cards, communication with a control unit provided within the mobile terminal apparatus is prohibited during communication with an external reader/writer, and alternately, communication with an external reader/writer is prohibited while communicating with a control unit, which makes this a communication protocol lacking in flexibility. It is also difficult for applications designated by a reader/writer to be smoothly activated and executed by a mobile terminal apparatus.

SUMMARY OF THE INVENTION

In order to resolve the aforementioned problems, it is an advantage of the present invention to provide a mobile terminal apparatus capable of smoothly activating and executing applications designated by an external communication means using a new communication protocol capable of flexible communication between non-contact communication means and internal control means.

The mobile terminal apparatus of the present invention comprises internal control means for controlling execution of prescribed applications, and non-contact communication means equipped with a first communication state for carrying out non-contact communication with external communication apparatuses over short distances and a second communication state for carrying out communication with the control means and being capable of moving communication state between the first communication state and the second communication state, for carrying out communication between the external communication apparatus or the internal control means.

Normally, communication with the internal control means is prohibited while the non-contact communication means is communicating with the external communication apparatus. However, the mobile terminal apparatus of the present invention has a flexible communication protocol capable of communication between the non-contact communication means and the internal control means even in cases where the non-contact communication means is communicating with the external communication apparatus, using a concept referred to as "interrupts".

Specifically, in the first communication state, the non-contact communication means receives at least interrupt information and execution application information indicating the application to be executed sent from the external communication apparatus in non-contact communication with the external communication apparatus using receiving means.

In the event that the interrupt information is received, the non-contact communication means adopts a state where communication with the internal control means is possible by giving notification to the internal control means to the effect that interrupt information has been received using notification means and making a transition from the first communication state to the second communication state using communication state changing means.

In the event that notification to the effect that the interrupt information has been received is received from the notification means of the non-contact communication means, the control means carries out communication with the non-contact communication means with the communication state put to the second communication state by the communication state changing means, execution application information received by the receiving means is taken in, and control of execution of applications corresponding to the taken-in execution application information takes place.

It is therefore possible for the control means to smoothly control activation and execution of applications designated by external communication means using the flexible communication protocol enabling communication with the internal control means while the non-contact communication means is communicating with the external communication apparatus.

In other words, applications at the mobile terminal apparatus can be automatically executed by sending applications to be executed to the mobile terminal apparatus by pushing from the external communication apparatus.

Further features of the invention, and the advantages offered thereby, are explained in detail hereinafter, in reference to specific embodiments of the invention illustrated in the accompanying drawings.

DESCRIPTION OF THE PREFERRED EMBODIMENTS

The present invention is applicable to a mobile telephone for transmitting and receiving audio data and packet data etc. in a wireless manner to and from a wireless base station via an antenna.

[First Embodiment]

[Configuration of First Embodiment]

[Overall Configuration]

The mobile telephone of the first invention of the present invention is comprised of a non-contact IC 2 (IC: Integrated Circuit) for carrying out short-range communication in a non-contact manner with an external reader/writer 1 shown in FIG. 1, an application manager controller 3 for taking in information (execution application information) specifying an application sent from the external reader 1 via the non-contact IC 2 and controlling execution, and application memory 4 for storing various application programs such as LED application programs (LED: Light Emitting Diode), WEB browser application programs, and application programs (sound/vibration) for audio control and vibration functions.

Figure 1:
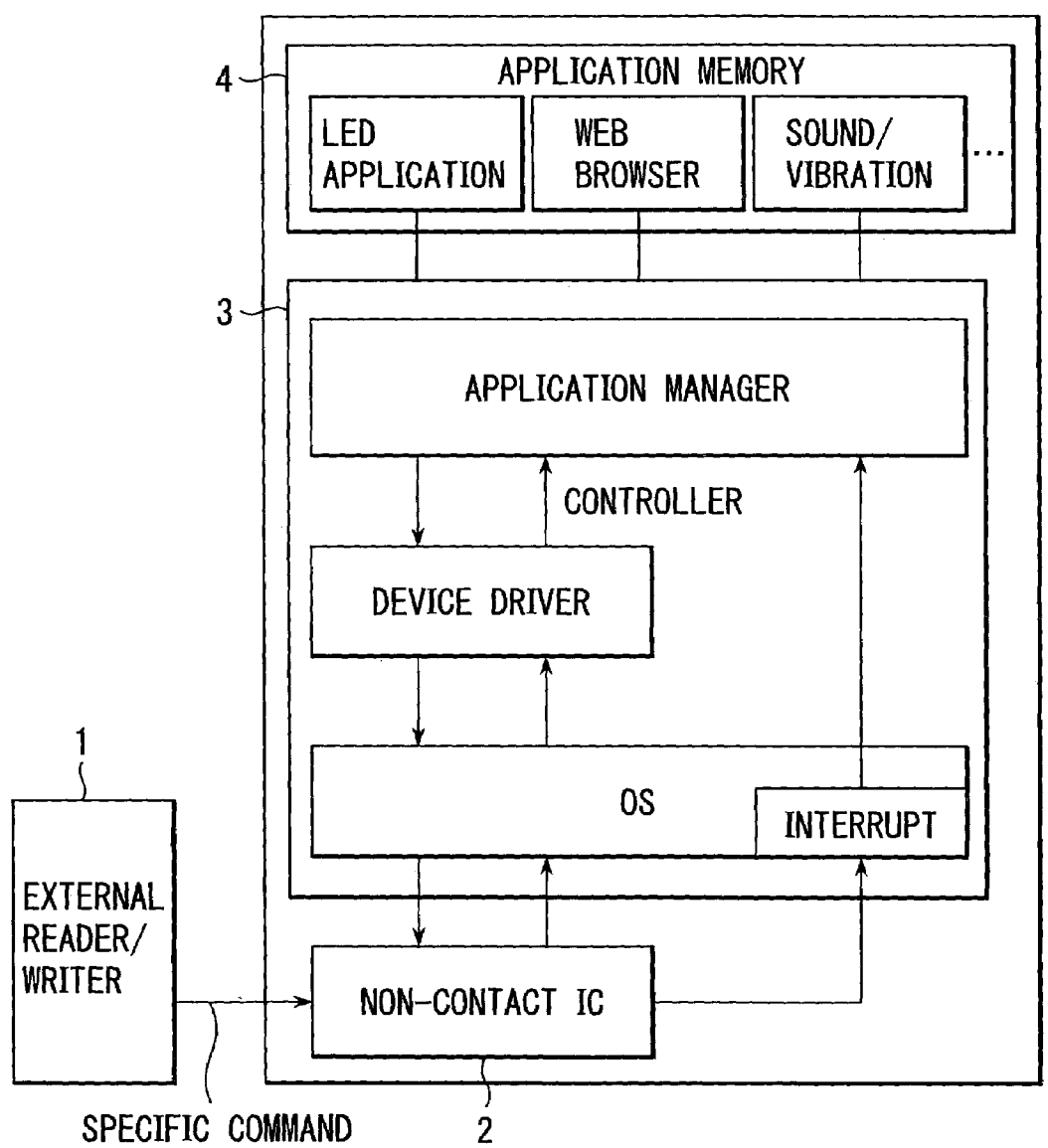
FIG. 1 is a block view of a mobile telephone of a first embodiment to which the present invention is applied.

In FIG. 1, blocks such as a communication function, audio/image processing function, and display function etc. the mobile telephone is equipped with are not shown but it is wished to be understood that these will naturally be provided.

[Controller Function]

As shown in FIG. 1, the application manager controller 3 has an operating system function (OS), disc driver function, and application manager function as shown in FIG. 1. Each of these functions are configured as software and the application manager controller 3 carries out operations corresponding to each function based on each software program.

[Configuration of Non-contact IC]

The non-contact IC 2 is comprised of an antenna 11 for transmitting and receiving information in short-distance communication with the external reader/writer 1, an RF unit 12 (RF: Radio Frequency) for subjecting information transmitted and received via the antenna 11 to information processing, volatile memory 13 (buffer memory) temporarily written with transmitted and received information, and a control unit 14 for controlling the overall operation of the non-contact IC 2.

Further, the non-contact IC 2 is comprised of a transmission terminal 15 (Tx terminal) provided with information transmitted via the antenna 11 and the RF unit 12, a receive terminal 16 (Rx terminal) outputting information received via the antenna 11 and the RF unit 12, and an earth connection terminal 17 (GND terminal).

The non-contact terminal IC 2 is comprised of a terminal I 18 (IBO3 terminal) for switching between a high level (H) and low level (L) voltage applied according to the communication state under the control of the control unit 14, a terminal V 19 (VRO terminal) and terminal P 20 (PPO_ON terminal).

Specifically, when a specific command is received from the external reader/writer 1, the voltage applied to the terminal I 16 is switched from "H" to "L" under the control of the control unit 14. Further, when communication with the external reader/writer 1 commences, the voltage applied to the terminal 19 (VRO terminal) is switched over from "H" to "L" under the control of the control unit 14. Also, when communication with the external reader/writer 1 commences, the voltage applied to the terminal P 20 (PPO_ON) is switched from "H" to "L" under the control of the control unit 14.

[Operation of First Embodiment]

[Non-contact IC Characteristics]

First, the non-contact IC 2 operates due to electrical power supplied from the external reader/writer 1 in the event of communication with the external reader/writer 1, and operates due to electrical power from the application manager controller 3 in the event of communication with the application manager controller 3.

In the event that a supply of electrical power is received from the external reader/writer 1, the non-contact IC 2 carries out communication based on the clock frequency of the external reader/writer 1. The non-contact IC 2 carries out communication based on the clock frequency of the application manager controller 3 in the event that a supply of electrical power is received from the application manager controller 3. The clock frequency in the event of communication with the external reader/writer 1 is different from the clock frequency in the event of communication with the application manager controller 3. It is therefore not possible for the non-contact IC 2 to communicate with the application manager controller 3 when communicating with the external reader/writer 1 and conversely it is not possible for communication with the external reader/writer 1 to take place during communication with the application manager controller 3.

Next, in the event of communication with the external reader/writer 1, the non-contact IC 2 exerts control so that the voltage applied to the terminal P 20 is a low level (L) using the control unit 14.

Further, in the event of communication with the external reader/writer 1, the non-contact IC 2 exerts control so that the voltage applied to the terminal V 19 is a low level (L) using the control unit 14.

Moreover, the non-contact IC 2 exerts control using the control unit 14 so that the voltage applied to the terminal I 18 is usually a high level during normal communication, and exerts control so that the voltage applied to the terminal I 18 is a low level in the event that a "specific command" (described later) is received.

Terminal I 18, terminal V 19 and terminal P 20 of the non-contact IC 2 are respectively connected to the application manager controller 3. The application manager controller 3 recognizes the communication state of the non-contact IC 2 based on the voltage levels applied to terminal I 18, terminal V 19 and terminal P 20.

The states of voltages applied to each of the terminals 18 to 20 can be controlled to be changed by changing the communication target of the non-contact IC 2 from the external reader/writer 1 to the application manager controller 3 or from the application manager controller 3 to the external reader/writer 1. In the following, the communication state (state of voltages applied to each of the terminals 18 to 20 of the non-contact IC 2) of the non-contact IC 2 in the event of communication between the non-contact IC 2 and the external reader/writer 1 is taken to be a "first communication state, and the communication state of the non-contact IC 2 in the event of communication between the non-contact IC 2 and the application manager controller 3 is taken to be a "second communication state".

[Communication operation at Normal Times]

Figure 3:
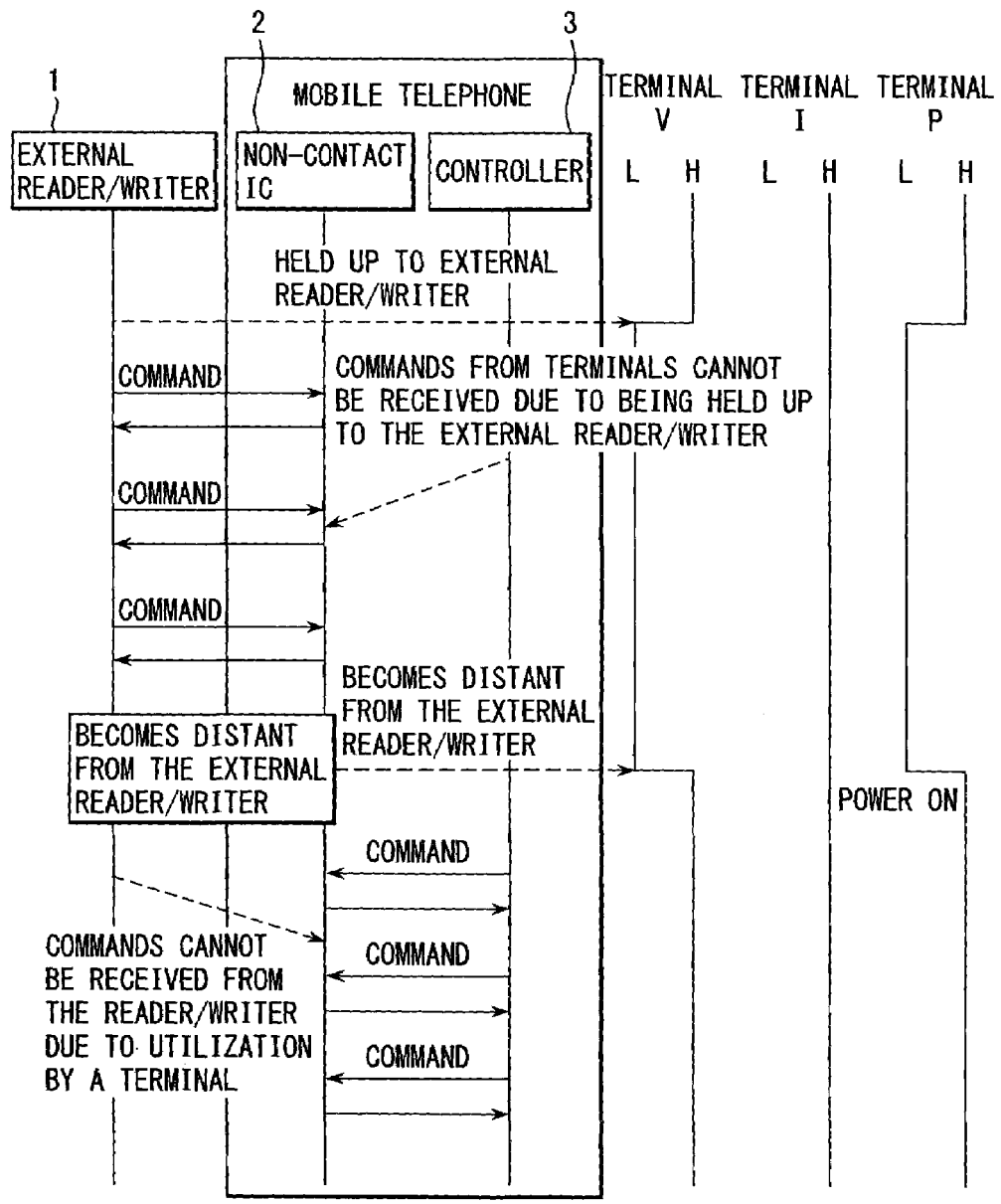
FIG. 3 is a sequence view illustrating communication between an external reader/writer, the non-contact IC of the mobile telephone and the controller during normal times.

FIG. 3 shows a sequence view illstrating a communication operation between the external reader/writer 1 and the mobile telephone in the event that a "specific command" is not used.

As shown in FIG. 3, first, in the event that the distance between the external reader/writer 1 and the mobile telephone becomes less than a fixed distance (the mobile telephone becomes close to the external reader/writer 1), supplying of electrical power from the external reader/writer 1 to the non-contact IC 2 is started using electromagnetic induction.

When the supply of electrical power from the external reader/writer 1 is commenced, the control terminal 14 puts the voltages applied to the terminal V 19 and the terminal P 20 to low levels and the communication state of the non-contact IC 2 is put to the "first communication state".

Transmission and receipt of various types of information (various information such as information identifying the non-contact IC 2, terminal number, and balance information) stored in the non-contact IC 2 to and from the external reader/writer 1 can then take place until the distance between the non-contact IC 2 and the external reader/writer 1 becomes greater than a fixed distance (until the mobile telephone becomes far away from the external reader/writer 1).

Next, in the event that the distance between the non-contact IC 2 and the external reader/writer 1 becomes greater than a fixed distance (in the event that the mobile telephone becomes far away from the external reader/writer 1), it is no longer possible for electrical power to be supplied to the non-contact IC 2 from the external reader/writer 1 using electromagnetic induction. The control unit 14 of the non-contact IC 2 constantly monitors the level of electromagnetic waves from the external reader/writer 1. In the event that the level of electromagnetic waves from the external reader/writer 1 becomes less than a prescribed level, it is recognized that the distance between the non-contact IC 2 and the external reader/writer 1 has become greater than a fixed distance. The control unit 14 then puts the voltages applied to the terminal V 19 and terminal P 20 to high levels and the communication state of the non-contact IC 2 is put to the "second communication state".

When the non-contact IC 2 enters the "second communication state", electrical power is supplied from the application manager controller 3 to the non-contact IC 2, and communication with the application manager controller 3 is possible. When the non-contact IC 2 enters the "second communication state", the application manager controller 3 carries out communication with the non-contact IC 2, and information taken in by the non-contact IC 2 from the external reader/writer 1 in the first communication state is taken in. The application manager controller 3 then operates based on the information taken-in from the non-contact IC 2.

It is necessary for the user to be well-versed in the operation of the mobile telephone in order for the user to smoothly utilize information taken in at the non-contact IC 2 from the external reader/writer 1. There is the fear that the non-contact IC 2 may not be effectively utilized by users that cannot start-up an application for displaying information taken in by the non-contact IC 2 at a display unit or by users that do not understand how to utilize the non-contact IC 2.

Further, the only ways to cause a mobile telephone to operate in the desired way have been to carry out prescribed operations using buttons etc. provided at the mobile telephone and transmit the operation content to the mobile telephone, or to have prescribed operations carried out automatically by the mobile telephone.

Moreover, in the event that a non-contact IC 2 is provided at the mobile telephone, it has been possible to display the content of information stored at the non-contact IC 2 at a display unit, but it has been necessary to bring the mobile telephone close to the external reader/writer 1, obtain an application, and then start-up the application by operating buttons of the mobile telephone etc. In other words, it has not been possible in the related art for an application to be started up and made to operate at a mobile telephone automatically simply by bringing the mobile telephone close to an external reader/writer.

Because of this, in a mobile telephone of a first embodiment, a "specific command" is sent from the external reader/writer 1 to the non-contact IC 2 during communication between the non-contact IC 2 of the mobile telephone and the external reader/writer 1. The communication state of the non-contact IC 2 is changed from the first communication state to the second communication state, and communication between the application manager controller 3 and the non-contact IC 2 is permitted. This provides flexibility of communication between the external reader/writer 1, the non-contact IC 2 and the internal application manager controller 3 and ensures that applications designated using a push from the external reader/writer 1 are activated and executed smoothly at the mobile terminal apparatus.

[Communication Operation Employing a Specific Command]

Figure 4:
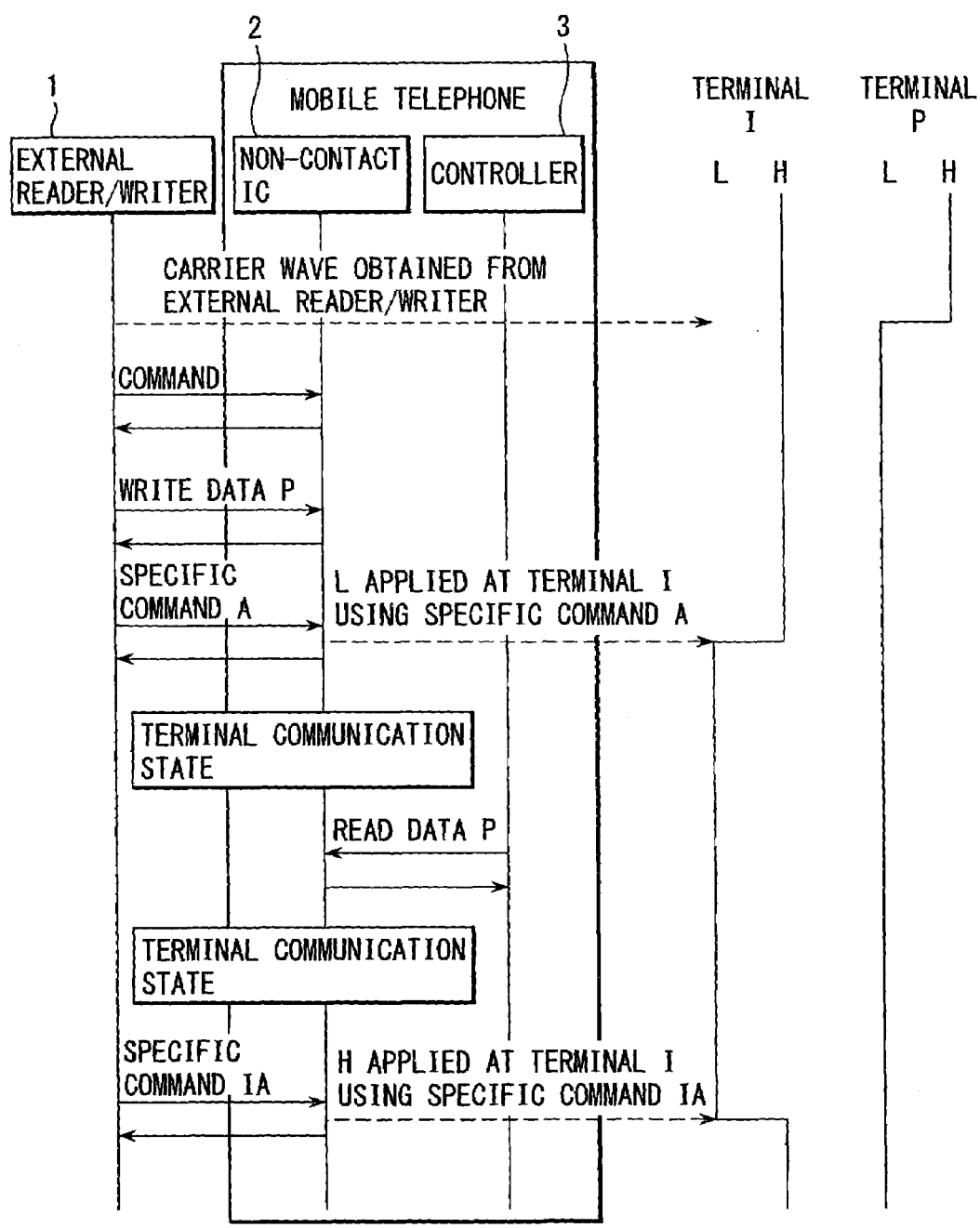
FIG. 4 is a sequence view illustrating communication between the external reader/writer, the non-contact IC of the mobile telephone and the controller in the event that a transition is made to a communication state of the non-contact IC using a specific command.

FIG. 4 shows a sequence view illustrating a communication operation between the external reader/writer 1 and the mobile telephone in the event that a "specific command" is used.

As shown in FIG. 4, in the event that the mobile telephone comes close to the external reader/writer 1, the voltage applied to the terminal P 20 of the non-contact IC 2 is put to a low level by the control unit 14 as described above, and the non-contact IC 2 carries out communication with the external reader/writer 1 in the first communication state.

During this time, the external reader/writer 1 sends execution application information (data P) designating an application to be started up at the mobile telephone to the non-contact IC 2 and sends a "specific command A" to the non-contact IC 2.

The control unit 14 of the non-contact IC 2 then performs control to store the execution application information sent from the external reader/writer 1 in volatile memory 13. Further, at the timing of receiving the "specific command A" from the external reader/writer 1, the control unit 14 of the non-contact IC 2 performs control to change the voltage applied to the terminal I 18 from a high-level to a low level, and changes the communication state of the non-contact IC 2 from the first communication state to the second communication state.

As described above, terminal I 18, terminal V 19 and terminal P 20 of the non-contact IC 2 are respectively connected to the application manager controller 3. More specifically, the terminal I 18 of the non-contact IC 2 is connected to an interrupt terminal of the application manager controller 3.

As a result, when it is detected that the voltage applied to the interrupt terminal has become a low-level (when it is detected that the voltage applied to the terminal I 18 of the non-contact IC 2 has become a low-level), the application manager controller 3 starts communication with the non-contact IC 2, and makes a transmission request for the execution application information (data P) stored in the volatile memory 13 of the non-contact IC 2.

Upon receiving this transmission request, the control unit 14 of the non-contact IC 2 sends execution application information stored in the volatile memory 13 to the application manager controller 3.

When the execution application information is taken in by the application manager controller 3 in this manner, transmission of the "specific command IA" from the external reader/writer 1 to the non-contact IC 2 is possible. Upon receiving the "specific command IA", the non-contact IC 2 applies a high-level voltage to the terminal I 18. As a result, a communication line temporarily formed between the non-contact IC 2 and the application manager controller 3 using the "specific command A" is closed.

In this example, while a specific command IA is sent from the external reader/writer 1 to the non-contact IC 2, the control unit 14 of the non-contact IC 2 applies a high-level voltage to the terminal I 18 so as to end communication between the non-contact IC 2 and the application manager controller 3. However, it is also possible to end communication between the non-contact IC 2 and the application manager controller 3 by applying a high level voltage to the terminal I 18 after transmitting execution application information from the non-contact IC 2 to the application manager controller 3. Further, by taking the mobile telephone away from the external reader/writer 1, it is also possible for the control unit 14 of the non-contact IC 2 to detect that the level of electromagnetic radiation from the external reader/writer 1 has dropped below a prescribed level and apply a high-level voltage to the terminal I 18 at this timing so as to end communication between the non-contact IC 2 and the application manager controller 3. In this way, the step of transmitting and receiving the "specific command IA" can be omitted.

Next, in the event that the execution application information is taken in, by operating based on the device driver and application manager shown in FIG. 1, the application manager controller 3 performs control so as to read an application program corresponding to the execution application information from the application memory 4 and execute the application corresponding to the read-out application program.

As a result, it is possible to carry out flexible communication between the external reader/writer 1, non-contact IC 2 and application manager controller 3, and it is possible to activate and execute the program designated in the form of a push from the external reader/writer 1 in a smooth manner at the mobile telephone.

[Effects of First Embodiment]

As is clear from the above description, the mobile telephone of the first embodiment transmits a specific command A together with execution application information for designating a prescribed application from the external reader/writer 1 during communication between the external reader/writer 1 and the non-contact IC 2. In the event that the specific command A is received, the non-contact IC 2 makes a transmission to the second communication state enabling communication with the application manager controller 3. The application manager controller 3 then captures and executes information specifying the application at the timing of the transition.

As a result, it is possible to carry out flexible communication between the external reader/writer 1, non-contact IC 2 and the internal application manager controller 3, and it is possible to activate and execute the program designated in the form of a push from the external reader/writer 1 in a smooth manner at the mobile terminal apparatus.

The mobile telephone of this embodiment is therefore capable of taking the approach of the mobile telephone to the external reader/writer 1 as a single user interface capable of starting up an application corresponding to the external reader/writer 1 without any user operations. When a large number of functions are provided on a mobile telephone, the number of users incapable of starting up a desired application also increases. However, with this mobile telephone it is possible to obtain desired information at a prescribed timing with a simple operation of bringing the mobile telephone close to the external reader/writer 1.

It is also possible for a user to utilize a system utilizing a non-contact IC without being conscious of the internal workings of the mobile telephone or the non-contact IC 2.

Even with applications requiring difficult operations for activation, these difficult activation operations can be omitted and activation may take place automatically. This can give the effect of promoting the utilization of applications requiring difficult operations for activation.

Currently, non-contact ICs are mainly utilized as cards for automatic ticketing etc. and it is difficult for a display section to be provided on a card as the situation stands. As a result, as with the mobile telephone of this embodiment, by providing the non-contact IC 2 within the mobile telephone, information taken in via the non-contact IC 2 can be displayed on a display unit etc. in real time and the usefulness of the non-contact IC 2 can be improved substantially.

For example, points services where points corresponding to an amount of money for purchased goods are stored on a card (contact or non-contact IC card) and are exchangeable for a product corresponding to the accumulated points afterwards are well known, but dedicated reading equipment is required to confirm the points accumulated on the card and the number of points cannot be confirmed in a straightforward manner by the user. However, with the mobile telephone of this embodiment, if the points are written to a non-contact IC 2 provided within the mobile telephone, it is possible for the user to confirm the points accumulated in a straightforward manner.

In the case of the mobile telephone of this embodiment, not only is information stored in the non-contact IC 2 read in, but writing of information can also be carried out. It is therefore possible for deposit information to be stored in the non-contact IC 2 in the case that the non-contact IC 2 is utilized in settlements, or when the balance is small.

[Second Embodiment]

Next, a description is given of a mobile telephone of a second embodiment of the present invention. With the mobile telephone of the first embodiment, control is exerted so as to store execution application information etc. sent from the external reader/writer 1 to the non-contact IC 2 in the volatile memory 13. However, it is not possible for the non-contact IC 2 to receive a supply of electrical power from the external reader/writer 1 in the event that the mobile telephone is taken away from the external reader/writer 1 during communication between the external reader/writer 1 and the non-contact IC 2 which gives rise to the inconvenience that the execution application information stored in the volatile memory 13 is volatile.

Figure 2:
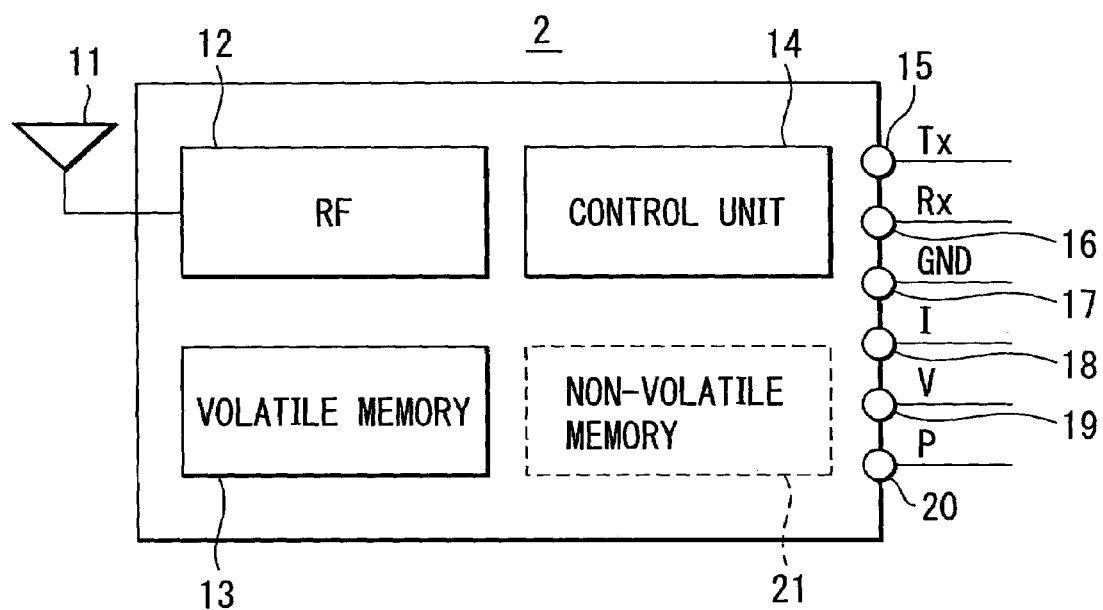
FIG. 2 is a block view of a non-contact IC provided at the mobile telephone.

The mobile telephone of the second embodiment is therefore provided with non-volatile memory 21 (flash memory) shown by the block of a dotted-line in FIG. 2 for the non-contact IC 2, and the execution application information is stored in this non-volatile memory 21.

Specifically, in the case of the mobile telephone of the second embodiment, as with the mobile telephone of the first embodiment described above, the "specific command A" is sent to the non-contact IC 2 from the external reader/writer 1 so that the non-contact IC 2 is able to communicate with the application manager controller 3 at the timing where the non-contact IC 2 receives this "specific command A".

In the event that communication with the non-contact IC 2 is possible, the application manager controller 3 takes in the execution application information stored in the non-volatile memory 21 and after this information is taken in, sends clear information to the non-contact IC 2.

Upon receiving the clear information from the application manager controller 3, the control unit 14 of the non-contact IC 2 recognizes that taking in of the execution application information by the application manager controller 3 is complete, and deletes the execution application information stored in the non-volatile memory 21.

In the case of the mobile telephone of the second embodiment, after information such as the execution application information is stored in the non-volatile memory 21 and the taking in by the application manager controller 3 is complete, information stored in the non-volatile memory 21 is deleted. It is therefore possible for information such as execution application information sent from the external reader/writer 1 to be kept even in cases where the supply of electrical power from the external reader/writer 1 cannot be received by the non-contact IC 2 due to the mobile telephone being brought away from the external reader/writer 1 during communication between the external reader/writer 1 and the non-contact IC 2.

In addition to it being possible to execute applications corresponding to execution application information sent from the external reader/writer 1 at the mobile telephone, it is also possible to obtain the same results as for the first embodiment described above.

[Third Embodiment]

Next, a description is given of a mobile telephone of a third embodiment of the present invention. With the mobile telephone of the first embodiment described above, execution application information sent from the external reader/writer 1 is taken in by the application manager controller 3 from the non-contact IC 2 taking the "specific command A" sent from the external reader/writer 1 to the non-contact IC 2 as a trigger. However, with the mobile telephone of the third embodiment, the execution application information sent from the external reader/writer 1 is taken in by the application manager controller 3 from the non-contact IC 2 taking the mobile telephone being taken away from the external reader/writer 1 as a trigger.

Figure 5:
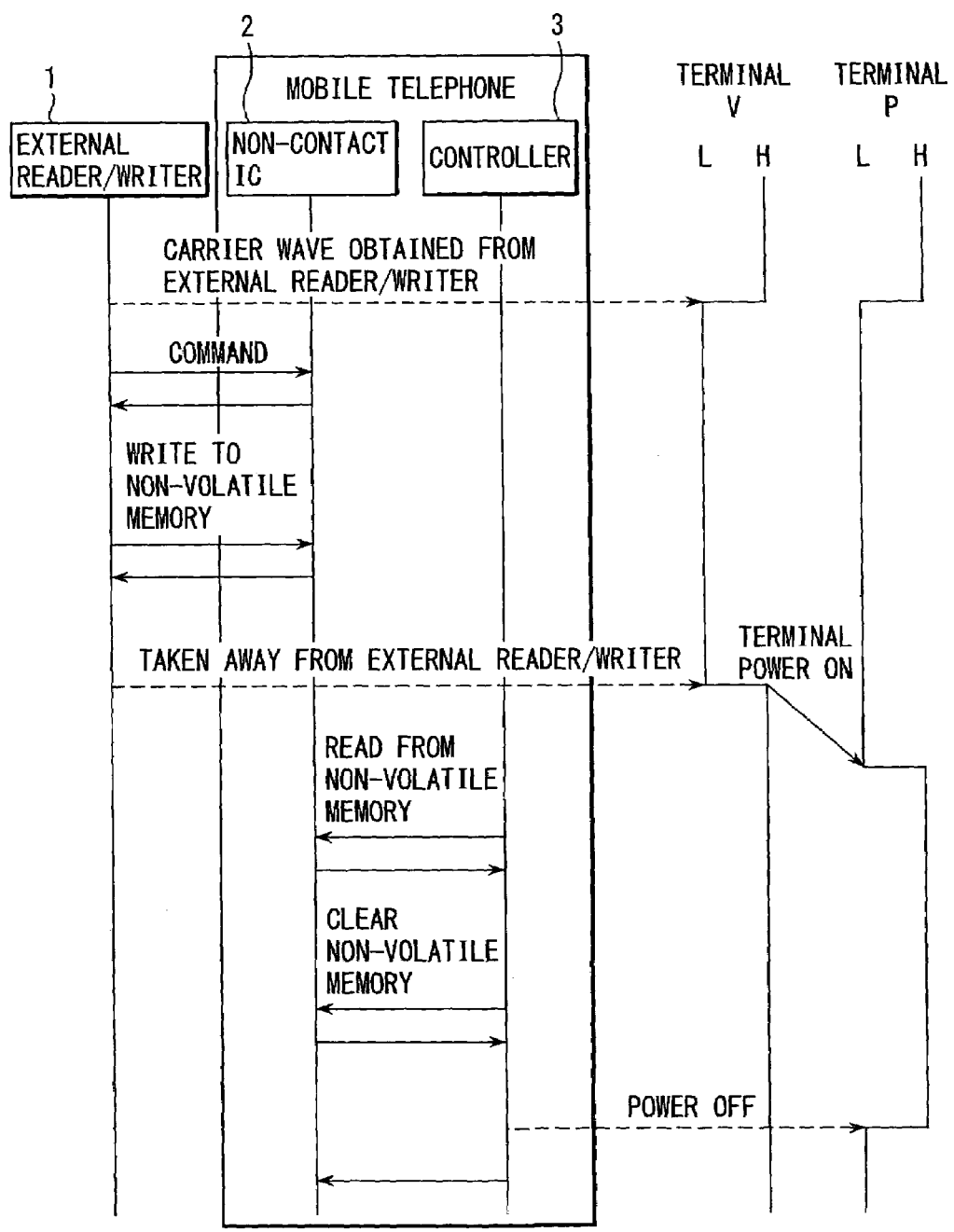
FIG. 5 is a sequence view illustrating communication between the external reader/writer, the non-contact IC of the mobile telephone and the controller in the event that a transition is made to a communication state of the non-contact IC based on the level of a wave from the external reader/writer.

In this case, as shown in FIG. 5, when the mobile telephone is moved close to the external reader/writer 1 so that supply of electrical power to the non-contact IC 2 through electromagnetic induction commences, the control unit 14 changes the voltage applied to the terminal V 19 and the voltage applied to the terminal P 20 from high levels to low levels. The communication state of the non-contact IC 2 is then put to the first communication state.

By doing this, communication between the external reader/writer 1 and the non-contact IC 2 becomes possible, and execution application information etc. can be sent from the external reader/writer 1 to the non-contact IC 2. The control unit 14 of the non-contact IC 2 then performs control to write the execution application information sent from the external reader/writer 1 to the non-volatile memory 21 (or the volatile memory 13).

Next, in the event that the mobile telephone is brought away from the external reader/writer 1, the supply of electrical power to the non-contact IC 2 using electromagnetic induction is halted. The control unit 14 therefore changes the voltage applied to the terminal V 19 and the voltage applied to the terminal P 20 from low levels to high levels, and the communication state of the non-contact IC 2 is put to the second communication state.

This makes communication between the application manager controller 3 and the non-contact IC 2 possible. The application manager controller 3 then takes in execution application information stored in the non-volatile memory 21 of the non-contact IC 2 and exerts control so as to execute an application corresponding to the execution application information via the device driver and application manager shown in FIG. 1.

Further, in the event that taking in of the execution application information ends, the application manager controller 3 sends clear information to the non-contact IC 2. When the clear information is received, the control unit 14 of the non-contact IC 2 exerts control to clear execution application information stored in the non-volatile memory 21, changes the voltage applied to the terminal P 20 from a high level to a low level, and closes the line of communication with the application manager controller 3.

With the mobile telephone of the third embodiment, the voltages applied to terminal V 19 and terminal P 20 of the non-contact IC 2 are controlled and the communication state (first communication state or second communication state) of the non-contact IC 2 is made to make transitions according to whether or not supply of electrical power to the non-contact IC 2 of the mobile telephone from the external reader/writer 1 has started.

As a result, it is possible for the communication state of the non-contact IC to make transitions without using the "specific command A", and the same results as for the mobile telephone of the first embodiment can be obtained.

[Fourth Embodiment]

Figure 6:
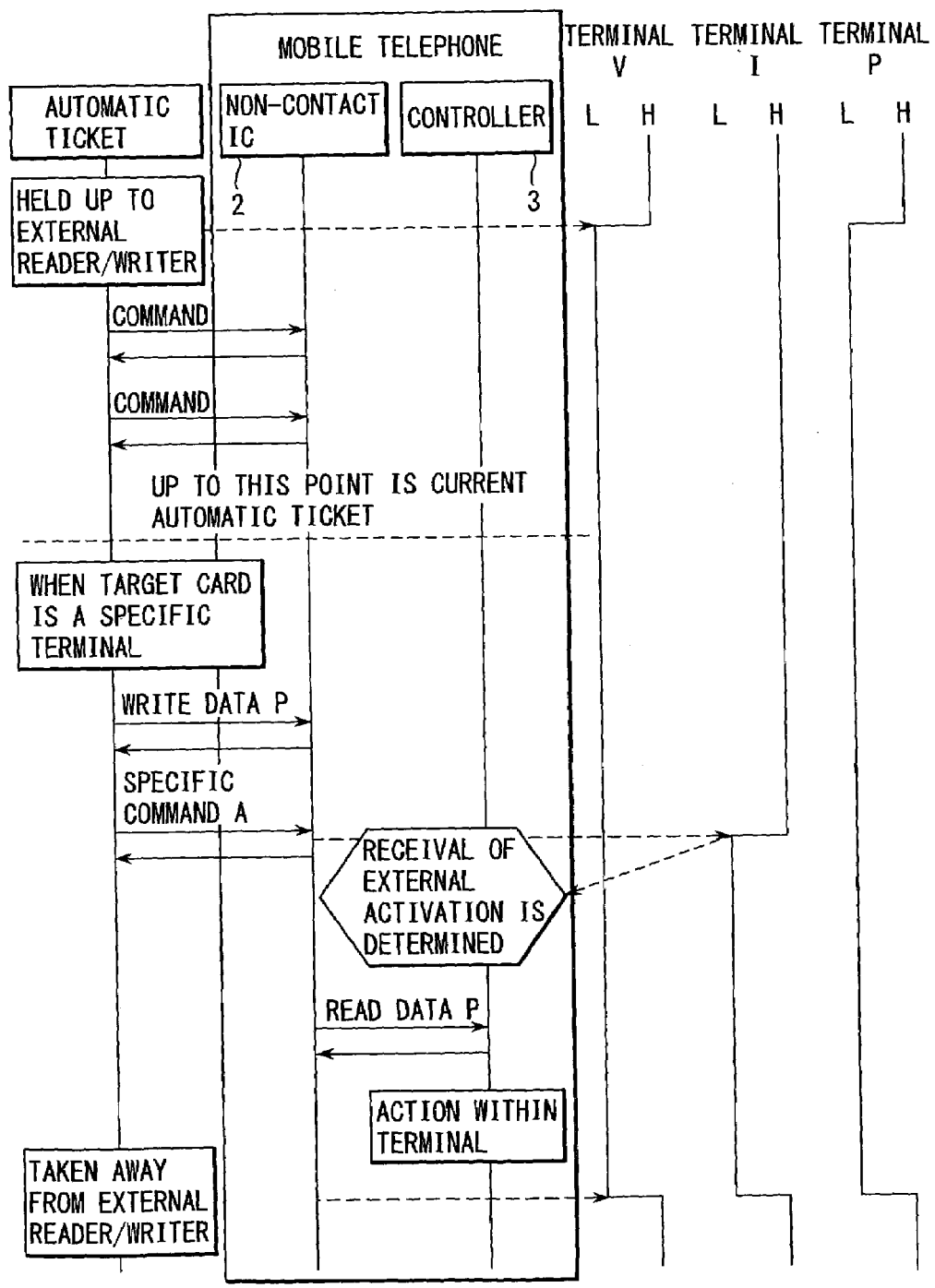
FIG. 6 is a sequence view illustrating communication between an automatic ticketing machine (external reader/writer), the non-contact IC of a mobile telephone and a controller in the event of performing automatic ticketing at an automatic ticketing machine of a station using the mobile telephone.

Next, a description is given of a fourth embodiment of the present invention. The fourth embodiment is an embodiment for the case where the mobile telephone is used in automatic ticketing. A sequence view showing communication between an automatic ticketing machine, and the non-contact IC 2 and application manager controller 3 of a mobile telephone in this case is shown in FIG. 6. In this case, it is taken that information such as ticket information and periodic commuter ticket information etc. that it is possible to write when passing through an automatic ticketing machine normally is written to the non-contact IC 2 of the mobile telephone.

In FIG. 6, first, the user brings the mobile telephone close to the external reader/writer 1 of the automatic ticketing machine. As a result, supply of electrical power from the external reader/writer 1 to the non-contact IC 2 of the mobile telephone commences, and the control unit 14 of the non-contact IC 2 changes the voltages applied to the terminal V 19 and the terminal P 20 from high levels to low levels. A transition is then made to the first communication state where communication is carried out with the external reader/writer 1.

When a communication line is formed with the non-contact IC 2, the external reader/writer 1 takes in periodic commuter ticket information and ticket information etc. stored at the non-contact IC 2 and transfers this to a control unit of the automatic ticketing machine. The control unit of the automatic ticketing machine checks whether or not a period of validity etc. has ran out based on the transmitted commuter information etc. and, providing the period of validity has not elapsed, opens the gate and allows the user to pass. The operation up to this point is the same as the operation of current automatic ticketing systems.

Next, the external reader/writer 1 carries out communication with the non-contact IC 2 and determines whether or not the non-contact IC 2 is a specific IC (whether or not the non-contact IC is capable of transmitting the specific command A). In the event that the non-contact IC 2 currently in communication is a non-contact IC capable of transmitting a specific command A, the execution application information (data P) and specific command A are transmitted.

Upon receiving this specific command A, the non-contact IC 2 of the mobile telephone changes the voltage applied to the terminal I 18 from a high level to a low level. As a result, the communication state of the non-contact IC 2 goes to the second communication state and communication with the application manager controller 3 is possible.

As described in the above, the voltage applied to the interrupt terminal of the application manager controller 3 is also put to a low level by connecting terminal I 18 of the non-contact IC 2 to the interrupt terminal of the application manager controller 3 and putting the voltage applied to the terminal I 18 of the non-contact IC 2 to a low level.

When it is detected that the voltage applied to the interrupt terminal has fallen to a low level, the application manager controller 3 recognizes this as an application activation instruction from outside. The application manager controller 3 then carries out communication with the non-contact IC 2 and takes in execution application information sent from the external reader/writer 1 to the non-contact IC 2. Execution of the application corresponding to the execution application information is then controlled via the device driver and application manager shown in FIG. 1. As a result, for example, a balance display application or a deposit application etc. can be made to be automatically started up and executed (action within a terminal) while a user is passing through an automatic ticketing machine.

Finally, the mobile telephone is taken away from the external reader/writer 1 as a result of the user passing through the automatic ticketing machine and the supply of electrical power from the external reader/writer 1 to the non-contact IC 2 is stopped. When supply of electrical power from the external reader/writer 1 is stopped, the non-contact IC 2 puts the voltages applied to terminal I 18, terminal V 19 and terminal P 20 to high levels and the communication line with the external reader/writer 1 of the automatic ticketing machine is closed.

[Effects of Fourth Embodiment]

Typically, two processes are necessary in order to display content such as balance etc. stored in a non-contact IC at a display unit in the event that, for example, a non-contact IC is provided at a mobile telephone and this is utilized in automatic ticketing:

1. The mobile telephone is brought close to the automatic ticketing machine (reader/writer) and the automatic ticketing machine is passed through.

2. The mobile telephone is operated and an application for displaying the content stored at the non-contact IC is started up.

Further, there are also cases where it is noticed that the balance is getting low as a result of the balance being displayed at a display unit of an automatic ticketing machine when passing through an automatic ticketing system. In this case, a paying in operation utilizing a paying in machine is required.

In the case of the mobile telephone of the fourth embodiment, it is possible to smoothly activate and execute applications designated in push form as described above by the external reader/writer 1 at the mobile terminal apparatus. It is therefore possible for the mobile telephone to confirm that an automatic ticketing machine has been passed through while passing through an automatic ticketing machine using a mobile telephone. In the event that an application is started up and the balance is low, it is possible for deposit processing to be carried out for the non-contact IC 2 at the same time as passing through the automatic ticketing machine. Namely, it is possible for a process for activating an application for deposit processing to be started up and be carried out at the same time as passing through the automatic ticketing machine using the mobile telephone to be achieved with a single process.

Further, it is also possible for the automatic ticketing machine to determine whether a user is getting on or getting off when the mobile telephone comes close to the automatic ticketing machine. As a result, information such at the next train to depart etc. can be given to a user that is getting on in the form of a push to the user of the mobile telephone in real time. Further, as a result of the user inputting their destination into their mobile telephone in advance, it is possible to push information such as a route that gives the shortest time and cheapest fare for the user to arrive at their destination to the mobile telephone of the user in real time.

Moreover, communication is carried out between the external reader/writer 1 of the automatic ticketing machine and the non-contact IC 2 of the mobile telephone while a user that is getting on passes through the automatic ticketing machine. An application to go into silent vibration mode or turn the power off is activated, and the mobile telephone of the user can therefore be automatically put into silent vibration mode or can be turned off.

Conversely, communication may also be carried out between the external reader/writer 1 of the automatic ticketing machine and the non-contact IC 2 of the mobile telephone while a user that is getting off passes through the automatic ticketing machine. It is then possible to deactivate the settings for silent vibration mode or for turning the power off that were set at the time of getting on.

Further, communication may also be carried out between the external reader/writer 1 of the automatic ticketing machine and the non-contact IC 2 of the mobile telephone while a user that is getting off passes through the automatic ticketing machine. It is then possible for advertising for the surrounding area or street information to be pushed in real-time.

The mobile telephone is by no means limited to being used with automatic ticketing systems, and may also be utilized in payments at register apparatuses of department stores or supermarket stores and payments when getting on or getting off on buses.

While the mobile telephone is used in making payments at the register apparatuses, payments for purchasing products may be made based on the balance stored in the non-contact IC 2, continuing on from this payment, a balance display application may be activated and the balance displayed, or a deposit processing application may be activated so that a deposit may be made automatically.

The mobile telephone is capable of automatically starting up mobile telephone applications in the form of a push from the external reader/writer 1. Applications are therefore possible in various services such as when, with a points service, a product is purchased or a service is utilized, a roulette application is automatically activated at the mobile telephone so that when a prescribed item appears a larger number of points than usual are assigned.

Finally, each of the aforementioned embodiments are given as examples of the present invention. As such, the present invention is by no means limited to each of the embodiments described above, and it goes without saying that various modifications according to design etc. are possible in addition to each of the aforementioned embodiments, without deviating from the scope of the technological concept of the present invention.

What is claimed is:

1. A mobile terminal apparatus, comprising:
   internal control means for controlling execution of prescribed applications; and
   non-contact communication means equipped with a first communication state for carrying out non-contact communication with an external communication apparatus over short distances and a second communication state for carrying out communication with said internal control means, for carrying out communication with said external communication apparatus or said internal control means by changing communication state between said first communication state and said second communication state;
   said non-contact communication means having
   (a) receiving means for receiving at least interrupt information and execution application information indicating the application to be executed transmitted from said external communication apparatus using said non-contact communication in said first communication state,
   (b) notification means for giving a notification to said internal control means when said interrupt information is received by said receiving means, and
   (c) communication state changing means for changing said first communication state into said second communication state when said interrupt information is received by said receiving means,
   wherein said internal control means carries out communication with said non-contact communication means in the second communication state which is changed by said communication state changing means, takes in said execution application information received by said receiving means, and controls so as to execute applications corresponding to said taken-in execution application information received by said receiving means when said notification is given by said notification means of said non-contact communication means, and
   wherein said non-contact communication means receives a communication termination information transmitted from said external communication apparatus by said receiving means when said internal control means completes said take-in of said execution application information in said second communication state, and said communication state changing means changes said second communication state into said first communication at receiving said communication termination information.

2. The mobile terminal apparatus according to claim 1,
said non-contact communication means further having a non-volatile memory means for storing said execution application information;
wherein said non-contact communication means stores said execution application information transmitted form said external communication apparatus to said non-volatile memory means when said receiving means of said non-contact communication means receives said execution application information, and
said internal control means takes in said execution application information stored in said non-volatile memory means when said notification is given by said notification means of said non-contact communication means, and controls said memory means so as to erase said execution application information after said take-in.

3. A mobile terminal apparatus, comprising:
internal control means for controlling execution of prescribed applications; and
non-contact communication means equipped with a fast communication state for carrying out non-contact communication with an external communication apparatus over short distances and a second communication state for carrying out communication with said internal control means, for carrying out communication with said external communication apparatus or said internal control means by changing communication state between said first communication state and said second communication state;
said non-contact communication means having
(a) receiving means for receiving at least interrupt information and execution application information indicating the application to be executed transmitted from said external communication apparatus using said non-contact communication in said first communication state,
(b) notification means for giving a notification to said internal control means when said interrupt information is received by said receiving means,
(c) communication state changing means for changing said fast communication state into said second communication state when, said interrupt information is received by said receiving means, and
(d) a non-volatile memory means for storing said execution application information,
wherein said internal control means carries out communication with said non-contact communication means in the second communication state which is changed by said communication state changing means, takes in said execution application information received by said receiving means, and controls so as to execute applications corresponding to said taken-in execution application information received by said receiving means when said notification is given by said notification means of said non-contact communication means,
wherein said non-contact communication means stores said execution application information transmitted form said external communication apparatus to said non-volatile memory means when said receiving means of said non-contact communication means receives said execution application information, and
said internal control means takes in said execution application information stored in said non-volatile memory means when said notification is given by said notification means of said non-contact communication means, and controls said non-volatile memory means so as to erase said execution application information after said take-in.

4. A mobile terminal apparatus, comprising:
internal control means for controlling execution of prescribed applications; and
non-contact communication means equipped with a first communication state for carrying out non-contact communication with an external communication apparatus over short distances and a second communication state for carrying out communication with said internal control means, for carrying out communication with said external communication apparatus or said internal control means by changing communication state between said first communication state and said second communication state, said non-contact communication means having;
(a) communication detecting means for detecting that communication with said external communication apparatus is commenced when the level of electromagnetic waves from said external communication apparatus becomes more than a prescribed level, and detecting that communication with said external communication apparatus is terminated when the level of electromagnetic waves from said external communication apparatus becomes less than a prescribed level,
(b) communication state changing means for changing a communication state of said non-contact communication means to said first communication state when said communication detecting means detects that communication with said external communication apparatus is commenced, and changing a communication state of said non-contact communication means to said second communication state when said communication detecting means detects that communication with said external communication apparatus is terminated, and
(c) receiving means for receiving an execution application information indicating the application to be executed transmitted from said external communication apparatus using said non-contact communication in said first communication state;
wherein said internal control means takes in said execution application information received by said receiving means, and controls so as to execute applications corresponding to said taken-in execution application information, when said communication detecting means detects that communication with said external communication apparatus is terminated and said communication state changing means changes the communication state of said non-contact communication means to said second communication state.

5. The mobile terminal apparatus according to claim 4,
said non-contact communication means further having a non-volatile memory means for storing an execution application information;
wherein said non-contact communication means stores said execution application information transmitted form said external communication apparatus to said non-volatile memory means when said receiving means of said non-contact communication means receives said execution application information, and
said internal control means takes in said execution application information stored in said non-volatile memory means when said communication detecting means detects that communication with said external communication apparatus is terminated and said communication state changing means changes the communication state of said non-contact communication means to said second communication state, and controls said memory means so as to erase said execution application information after said take-in.

6. A mobile terminal apparatus, comprising:

internal controller which controls execution of prescribed applications; and non-contact communication IC equipped with a first communication state for carrying out non-contact communication with an external communication apparatus over short distances and a second communication state for carrying out communication with said internal controller, for carrying out communication with said external communication apparatus or said internal controller by changing communication state between said first communication state and said second communication state, said non-contact communication IC having;

(a) radio frequency unit which receives at least interrupt information and execution application information indicating the application to be executed transmitted from said external communication apparatus using said non-contact communication in said first communication state, (b) notification terminal which gives a notification to said internal controller when said interrupt information is received by said radio frequency unit, and (c) control unit which changes said first communication state to said second communication state when said interrupt information is received by said radio frequency unit;

wherein said internal controller carries out communication with said non-contact communication IC in the second communication state which is changed by said control unit, takes in said execution application information received by said radio frequency unit, and controls so as to execute applications corresponding to said taken-in execution application information received by said radio frequency unit when said notification is given by said notification terminal of said non-contact communication IC, and said non-contact communication IC receives a communication termination information transmitted from said external communication apparatus by said radio frequency unit when said internal controller completes said take-in of said execution application information in said second communication state, and said control unit changes said second communication state into said first communication at receiving said communication termination information.

7. The mobile terminal apparatus according to claim 6, said non-contact communication IC further having a non-volatile memory for storing said execution application information;

wherein said non-contact communication IC stores said execution application information transmitted form said external communication apparatus to said non-volatile memory when said radio frequency unit of said non-contact communication IC receives said execution application information, and said internal controller takes in said execution application information stored in said non-volatile memory when said notification is given by said notification terminal of said non-contact communication IC, and controls said memory so as to erase said execution application information after said take-in.

8. A mobile terminal apparatus, comprising:

internal controller which controls execution of prescribed applications; and non-contact communication IC equipped with a first communication state for carrying out non-contact communication with an external communication apparatus over short distances and a second communication state for carrying out communication with said internal controller, for carrying out communication with said external communication apparatus or said internal controller by changing communication state between said first communication state and said second communication state, said non-contact communication IC having;

(a) radio frequency unit which receives at least interrupt information and execution application information indicating the application to be executed transmitted from said external communication apparatus using said non-contact communication in said first communication state, (b) notification terminal which gives a notification to said internal controller when said interrupt information is received by said radio frequency unit, (c) control unit which changes said first communication state to said second communication state when said interrupt information is received by said radio frequency unit, and (d) a non-volatile memory which stores said execution application information, wherein said internal controller carries out communication with said non-contact communication IC in the second communication state which is changed by said control unit, takes in said execution application information received by said radio frequency unit, and controls so as to execute applications corresponding to said taken-in execution application information received by said radio frequency unit when said notification is given by said notification terminal of said non-contact communication IC, said non-contact communication IC stores said execution application information transmitted form said external communication apparatus to said non-volatile memory when said radio frequency unit of said non-contact communication IC receives said execution application information, and said internal controller takes in said execution application information stored in said non-volatile memory when said notification is given by said notification terminal of said non-contact communication IC, and controls said memory so as to erase said execution application information after said take-in.

* * * * *

UNITED STATES PATENT AND TRADEMARK OFFICE
CERTIFICATE OF CORRECTION

| | | |
|---|---|---|
| PATENT NO. | : 7,184,706 B2 | Page 1 of 1 |
| APPLICATION NO. | : 10/948148 | |
| DATED | : February 27, 2007 | |
| INVENTOR(S) | : Takahisa Someya et al. | |

It is certified that error appears in the above-identified patent and that said Letters Patent is hereby corrected as shown below:

Column 15, line 20, change "fast" to -- first --

Column 15, line 40, change "fast" to -- first --

Signed and Sealed this

Tenth Day of July, 2007

JON W. DUDAS
*Director of the United States Patent and Trademark Office*